M. P. CALLENDER.
Improvement in Churns.
No. 130,976. Patented Sep. 3, 1872.
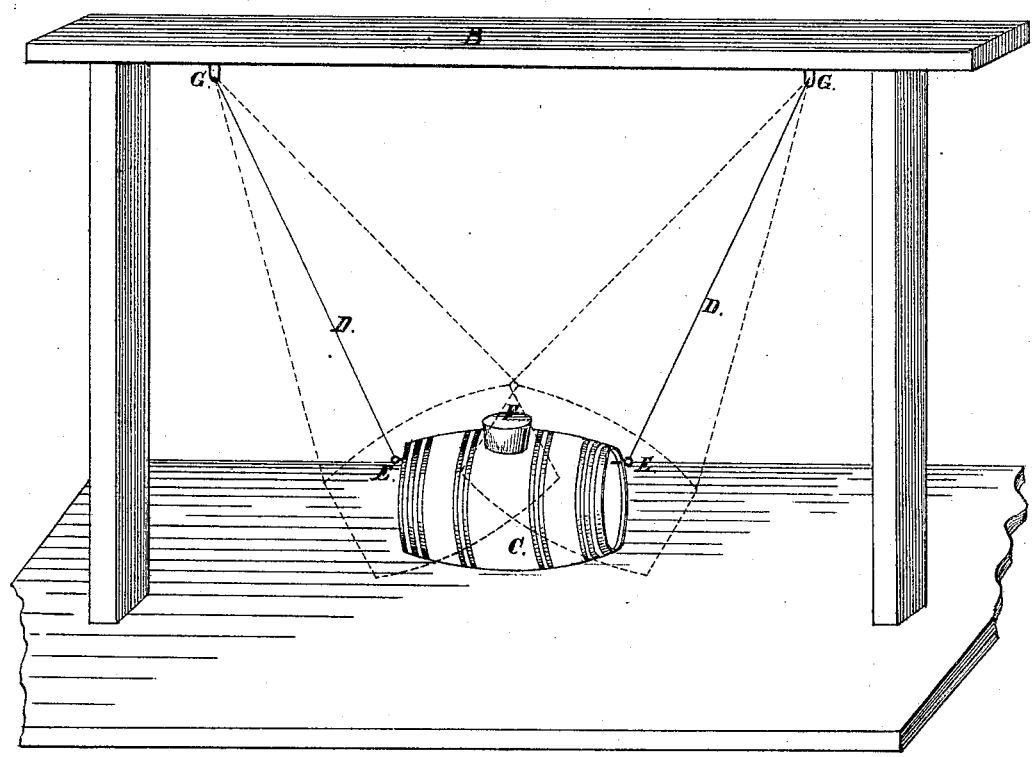
Witnesses:
Edwd M. Perkins
C. C. Sanderson
Inventor:
M. P. Callender.
By his Attorneys,
A. M. Callender & Co.

UNITED STATES PATENT OFFICE.

MELVILLE P. CALLENDER, OF ASTORIA, OREGON.

IMPROVEMENT IN CHURNS.

Specification forming part of Letters Patent No. 130,976, dated September 3, 1872.

Specification describing certain Improvements in Churns, for converting cream into butter, invented by MELVILLE P. CALLENDER, of Astoria, in the county of Clatsop and State of Oregon.

My invention relates to a mode of mounting a vessel containing the milk or cream from which butter is to be made in such a manner that the greatest amount of violent agitation may be imparted to the contents with the smallest amount of labor. The form of vessel used is not material, as it may be either a square or cylindrical box, or a barrel, or a metallic can. It is preferable that it be of a somewhat elongated shape.

The figure represents a barrel or keg, C, mounted according to my plan. The lines G D E G D E represent cords, chains, straps, rods, or wires, which are attached to the key at the points E E in any suitably-substantial way, these points being near the chines of the keg, so that the center of gravity of the latter will be considerably below these points of suspension. The points of suspension G G from the beam B above I prefer to remove from each other to a distance much greater than, say, twice the length of the vessel C. F represents a plug closing the opening through which the milk or cream is introduced, which opening should be large enough to permit easy access to the whole interior surface for convenience of cleaning the same.

The mode of operating my churn is by swinging it longitudinally alternately into the two positions represented by the dotted lines, whereby the contents will be dashed forcibly back and forth from end to end alternately.

Claim.

I claim as my invention—

1. The attachment of a vessel, holding milk or cream, by its two ends to two lines of suspension, which are fastened above to two points separated from one another in the same vertical plane with the two ends, to a distance as great as or greater than the distance between the two ends, substantially as described.

2. The churning of milk or cream into butter by swinging longitudinally a vessel holding the same, which is suspended substantially as described.

MELVILLE P. CALLENDER.

Witnesses:
JOHN W. GEARHART,
A. VAN DUSEN.